Aug. 1, 1961 R. E. GOTTFRIED 2,994,789
PASSIVE SIGNAL GATING CIRCUIT
Filed Nov. 29, 1957 2 Sheets-Sheet 1

Robert E. Gottfried
INVENTOR.
BY Allen E. Botney Agent
Morris Spector
ATTORNEY

PASSIVE SIGNAL GATING CIRCUIT

Filed Nov. 29, 1957

Robert E. Gottfried
INVENTOR.
Allen Z. Botney, Agent
BY Morris Spector,
ATTORNEY United States Patent Office 2,994,789

Patented Aug. 1, 1961

2,994,789

PASSIVE SIGNAL GATING CIRCUIT

Robert E. Gottfried, Torrance, Calif., assignor, by mesne assignments, to Thompson Ramo Wooldridge Inc., Cleveland, Ohio, a corporation of Ohio Filed Nov. 29, 1957, Ser. No. 699,848

4 Claims. (Cl. 307—88.5)

The present invention relates in general to gating circuits and more particularly to a gating circuit that uses a control signal whose voltage is significantly smaller than the signal voltage to be gated.

Many problems exist in the communications digital and control fields which require for their solution the use of gating circuits to either pass or reject given electrical signals. From the standpoint of reliability and simplicity a passive gating circuit, that is, a gating circuit that requires no active elements, such as tubes or transistors, is a preferred and often a necessary type.

By far the majority of the passive gating circuits found in the prior are employ diodes in some manner to pass or reject a given signal and a common problem of all these diode gates is that the control signal must always be as great as or greater than the signal to be gated. As a result, the various switching elements used to supply the control signal, such as flip-flops, must operate at relatively high voltages. It will be obvious to those skilled in the art that such a requirement is particularly difficult to meet if the switching stages employ transistors.

It is, therefore, an object of the present invention to provide a passive gating circuit for selectively passing or rejecting signals under the control of another signal whose amplitude is smaller than that of the signals to be gated.

It is another object of the present invention to provide a passive gating circuit that requires a relatively small amount of power to control the disposition of a relatively large amount of power.

It is a further object of the present invention to provide a gating circuit having a relatively low insertion loss when in the "pass" condition and that highly attenuates the signal to be gated when in the "reject" condition.

It is an additional object of the present invention to provide a passive gating circuit that is highly simple in its construction and that does not require adjustments or critical voltage levels for its efficient operation.

The stringent voltage level requirements of the passive gating circuits encountered in the prior art are obviated by the present invention and, in accordance with its basic concept, this is done by maintaining a high current ratio between the currents flowing in the circuit due to the control and applied signals. More particularly, according to an embodiment of the present invention, a variable voltage level control signal is applied through a relatively small resistor to a first diode connected in series with the source of the signals to be gated and also to a second diode connected in shunt therewith. When the control signal is at a first predetermined voltage level, the first diode is rendered current conducting so that the circuit is now in an operable condition for passing the applied signals, ordinarily a series of pulses, to an output load resistor. At the same time, the second diode is back-biased and, therefore, is rendered non-conducting, thereby acting as an open circuit.

The resistance of the output load resistor is very much greater than that of the small resistor first mentioned above. Consequently, the component of current flowing through the first diode due to the control signal is correspondingly greater than the component of current flowing therethrough due to the applied signal, with the result that the first diode remains conducting. Hence, the applied signal is passed through to the output load resistor notwithstanding the fact that its amplitude is very much greater than the first predetermined voltage level of the control signal. On the other hand, when the control signal is at a second predetermined voltage level, the first diode is rendered non-conducting whereas the second diode is rendered conducting, with the result that the applied signals are highly attenuated, in the order of 60 decibels, and thereby prevented from being passed to the circuit output.

It will thus be seen that a small voltage may be used to control a much larger voltage or, stated differently, a relatively small amount of electrical power may be used to control the disposition of a much larger amount of electrical power. It will also be recognized by those skilled in the art that by operating the first diode at a point along the straight portion of the diode characteristic curve, the variational or alternating current resistance of the diode will vary but little when the signals to be passed are applied to the circuit. More specifically, when current due only to the control signal is flowing through the first diode, the variational resistance thereof is about 75 ohms. When the current through the first diode is somewhat reduced due to the applied signals, the variational resistance is only slightly increased by 10 or 20 ohms. Hence, the insertion loss of the circuit is rather small with the result that the applied signal is developed across the output load resistor at substantially its original amplitude. Furthermore, due to the fact that the voltage levels of the control signals need not be maintained at a minimum value, the circuit of the present invention requires no adjustment for its continued effective operation.

The novel features which are believed to be characteristic of the invention, both as to its organization and method of operation, together with further objects and advantages thereof, will be better understood when considered in connection with the accompanying drawings in which an embodiment of the invention is illustrated by way of example.

Figure 1:
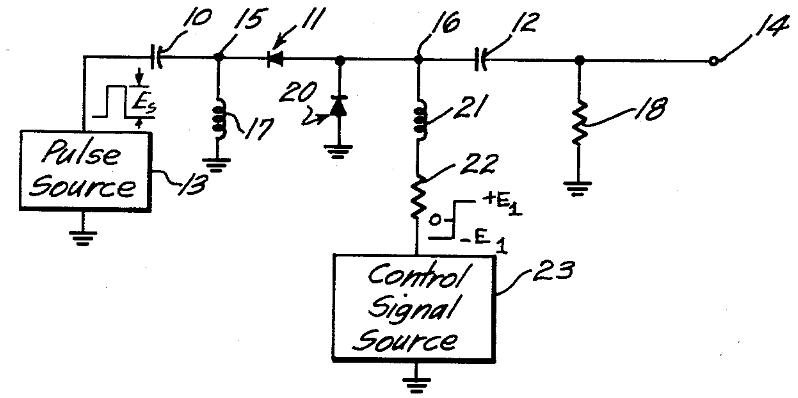
FIGURE 1 is a schematic diagram of a gating circuit according to the present invention.

Referring now to the drawings, there is shown in FIGURE 1 a gating circuit embodying the present invention and, as shown therein, a capacitor 10, a diode generally designated 11, preferably a crystal diode, and a capacitor 12 are electrically connected in series between a pulse source 13 and an output terminal 14. More specifically, one end of pulse source 13 is connected to ground, capacitor 10 being connected between the other end of source 13 and a junction 15. The cathode of diode 11 is connected to junction 15, the anode of this diode being connected to a junction 16. Capacitor 12 is connected between junction 16 and output terminal 14. An inductor 17 is connected between junction 15 and ground, an output load resistor 18 is connected between output terminal 14 and ground, and a diode generally designated 20, preferably a crystal diode, is connected between junction 16 and ground, the cathode of diode 20 being connected to junction 16. Also connected between junction 16 and ground is a series combination including an inductor 21, a resistor 22 and a control signal source 23. One end of inductor 21 is connected to junction 16, one end of source 23 is connected to ground and resistor 22 is connected between inductor 21 and source 23.

Considering certain necessary characteristics of the circuit elements, coupling capacitors 10 and 12 are inserted to prevent the control signal from being developed across output load resistor 18 and from being fed back to pulse source 13. Accordingly, in order to permit full coupling of the applied signals to diode 11 and from there to resistor 18, that is to say, in order to prevent any sizeable voltage drops across capacitors 10 and 12, the capacitive reactances of these capacitors must necessarily be small compared to the resistance of resistor 18. On the other hand, it will be obvious that in order to prevent attenuation of the signals out of pulse source 13 and also to prevent these applied signals from being fed into control signal source 23, inductors 17 and 21 must have such values of inductance that, at the frequency components of the signals applied by pulse source 13, the reactances of these elements are high compared to the value of resistance of output resistor 18. Stated more specifically, the respective values of inductance of inductors 17 and 21 are selected so that the reactances of these inductors are relatively high at the fundamental frequency of the applied pulses. With respect to resistors 18 and 22, the resistance of resistor 18 must be very much larger than that of resistor 22, the exact ratio of their resistances being determined by the components of current that it is desired to have flowing through the circuit, as will be more clearly understood from the description of the circuit operation.

In considering the operation, it will be initially assumed that the gating circuit of FIGURE 1 is in an "on" condition, that is to say, that the control signal applied to the circuit is at a predetermined positive voltage level $E_1$ which forward biases diode 11 and, therefore, causes current to flow from source 23, through resistor 22, inductor 21, diode 11 and inductor 17 to ground.

The resistance of inductor 21 and diode 11 are relatively small, the magnitude $I_1$ of the current flowing through diode 11 therefore being, for all practical purposes, equal to $E_1/R_1$, where $R_1$ is the value of resistance of resistor 22.

When a pulse whose amplitude is $E_s$ is applied to the gating circuit by source 13, a component of current of magnitude $I_2$ equal to $E_s/R_L$ tends to flow through output load resistor 18, which has the effect of reducing by that amount the already existing current $I_1$ through diode 11. However, by making the resistance of resistor 18, namely $R_L$, sufficiently large, $I_2$ will be smaller than $I_1$ so that diode 11 will continue to conduct current and, for all practical purposes, present a shorted connection between junctions 15 and 16, during the occurrence of pulse $E_s$. In consequence thereof, current $I_2$ will actually flow through resistor 18 and pulse $E_s$ will thereby be produced at output terminal 14.

Stated in a different way, effective passage of the applied pulse $E_s$ to output terminal 14 is dependent upon the continued conduction of diode 11 during the period the pulse is applied and this pre-requisite may be met by making $$\frac{E_1}{R_1} > \frac{E_s}{R_L}$$

Assuming that $E_s$ is a given value and, therefore, not adjustable, and also that $E_1$ and $R_1$ are restricted in order to obtain certain operating conditions, the above inequality may therefore be attained by selecting a large enough value of $R_L$.

Thus, although in an ordinary gating circuit the pulse $E_s$ would back-bias diode 11 and thereby prevent the full magnitude of the pulse from being passed to output terminal 14, in the gating circuit of the present invention the large resistive value of resistor 18 limits the magnitude of the current due to $E_s$ so that, although the current through diode 11 is somewhat reduced, current nevertheless continues to flow through the diode, thereby permitting the full value of the applied pulse to be passed through the diode to output terminal 14. It is thus seen that by an appropriate selection of circuit parameters a small voltage may be used to control the passage of a very much larger voltage.

When the control signal is switched to a predetermined negative voltage level $-E_1$, diode 11 is back-biased and rendered non-conducting or inoperative whereas diode 20, which was previously inoperative, is now forward-biased and thereby rendered operative. Accordingly, diode 20 is now able to conduct current therethrough. As a result, the gating circuit is now in an "off" state or "reject" condition. If a positive pulse $E_s$ is now applied to the circuit by source 13, the pulse will be highly attenuated both by the back resistance of diode 11 and the effective short to ground of diode 20. Hence, when the gating circuit is in an "off" state, the applied pulse is effectively prevented from appearing at terminal 14.

Although the gating circuit of FIGURE 1 is arranged to selectively pass positive pulses under the control of a positive voltage level, it should be apparent that the invention may be applied as well to the gating of negative pulses. This may be accomplished by reversing the connections in the circuit of diodes 11 and 20 and, additionally, reversing the polarity of the control signal. More specifically, to gate negative pulses, the cathode and anode of diodes 11 and 20, respectively, should be connected to junction 16, the anode of diode 11 should be connected to junction 15 and the cathode of diode 20 should be connected to ground. Furthermore, to properly bias the reversely connected diodes and, thereby, put the circuit in a "pass" state, a negative voltage $-E_1$ should be applied to the circuit by source 23. Obviously, therefore, the circuit will be in a "reject" state when a positive voltage is applied by source 23. Since the above-described adaptation of the circuit in FIGURE 1 for the gating of negative pulses is easily visualized, no additional figure showing such a circuit is deemed necessary.

It should be noted here in connection with the circuit of FIGURE 1 that it would be feasible to couple the applied pulses to diode 11 by means other than capacitor 10 and inductor 17. One such means would be a pulse transformer, the secondary winding of the transformer replacing inductor 17.

Figure 2:
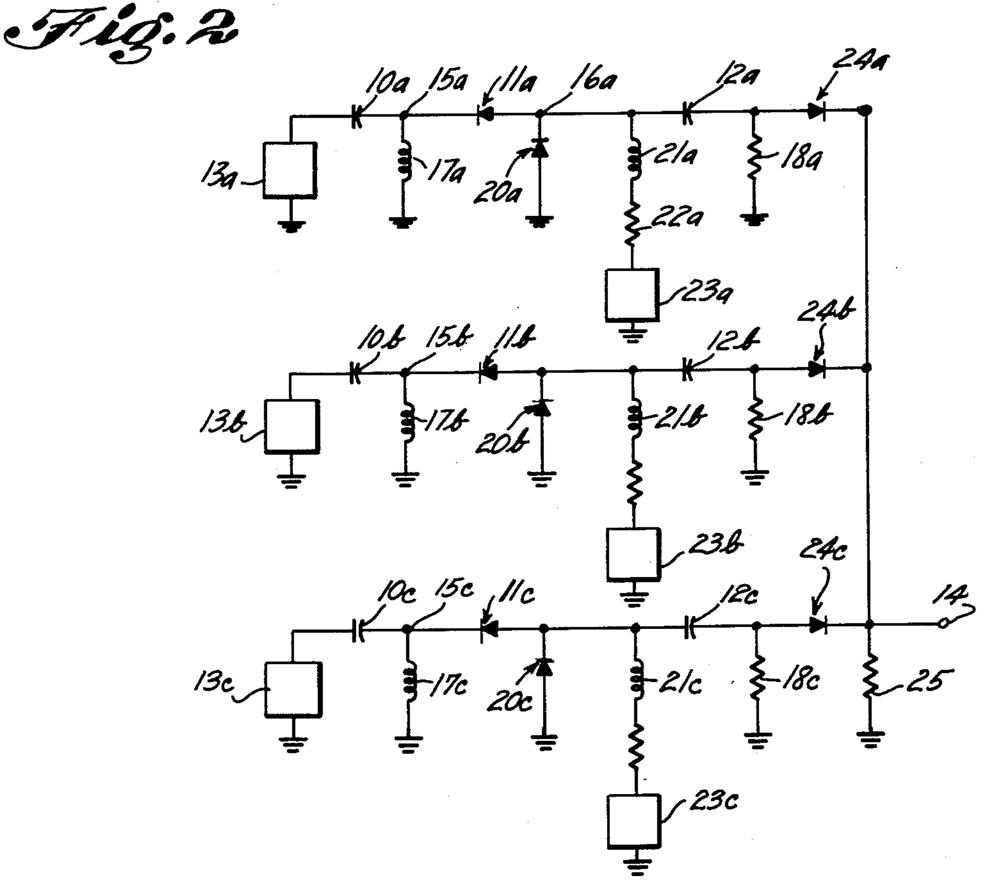
FIGURE 2 is a schematic diagram of several gating circuits, each of the type shown in FIGURE 1, connected in parallel to form an "or" circuit.

Several of the circuits shown in FIGURE 1 may be combined in one way or another to provide various other types of gating circuits. Thus, for example, as shown in FIGURE 2, three such gating circuits have been connected in parallel to provide what is commonly referred to as an "or" gate, the only difference between the individual channels of the circuit shown in FIGURE 2 and the circuit shown in FIGURE 1 being that diodes **24*a*, 24*b* and 24*c* have been added to isolate one channel from another. A resistor 25 has also been added to provide a common output load resistor. The operation of each of the three gating circuits of FIGURE 2 is exactly the same as heretofore described and consequently, no further description is thought necessary. It should be mentioned, however, that by slightly modifying one or more of the individual gating circuits, the pulses applied to the circuit by sources 13*a*, 13*b* and 13*c* may be both positive and negative, the algebraic sum of the pulses simultaneously applied being produced across resistor 25 and, therefore, at output terminal 14. By way of example, if negative pulses are being generated by pulse generator 13*a* and positive pulses by generators 13*b* and 13*c*, the negative pulses can be accommodated by reversing the connections of diodes 11*a* and 20*a*, reversing the polarity of the control signal to a $-E$ voltage level and, as will be obvious to those skilled in the art, by replacing diodes 24*a*, 24*b* and 24*c* with isolating devices, preferably cathode follower circuits. Otherwise, the negative pulses would pass through diodes 24*b* and 24*c* and be shorted to ground through diodes 20*b* and 20*c***, respectively.

Figure 3:
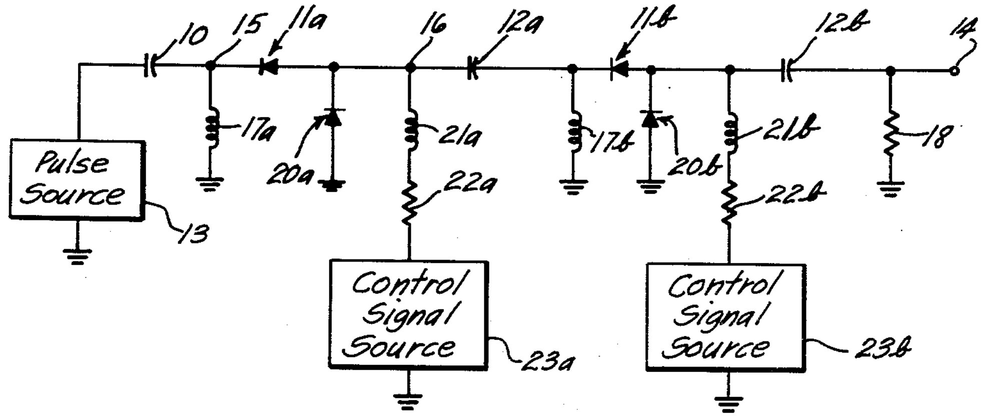
FIGURE 3 is a schematic diagram of two gating circuits of the type shown in FIGURE 1 connected in series to form an "and" circuit.

Another example of how several gating circuits according to the present invention may be combined is shown in FIGURE 3 and, as shown therein, two such gating circuits have been connected in tandem to provide what is commonly known as an "and" gate. Again, each of the two gating circuits operates exactly as previously described. Hence, suffice it to say that a pulse applied to the circuit by source 13 will pass to output terminal 14 only when the control signals generated by sources **23*a* and 23*b*** are at the same voltage level.

Figure 4:
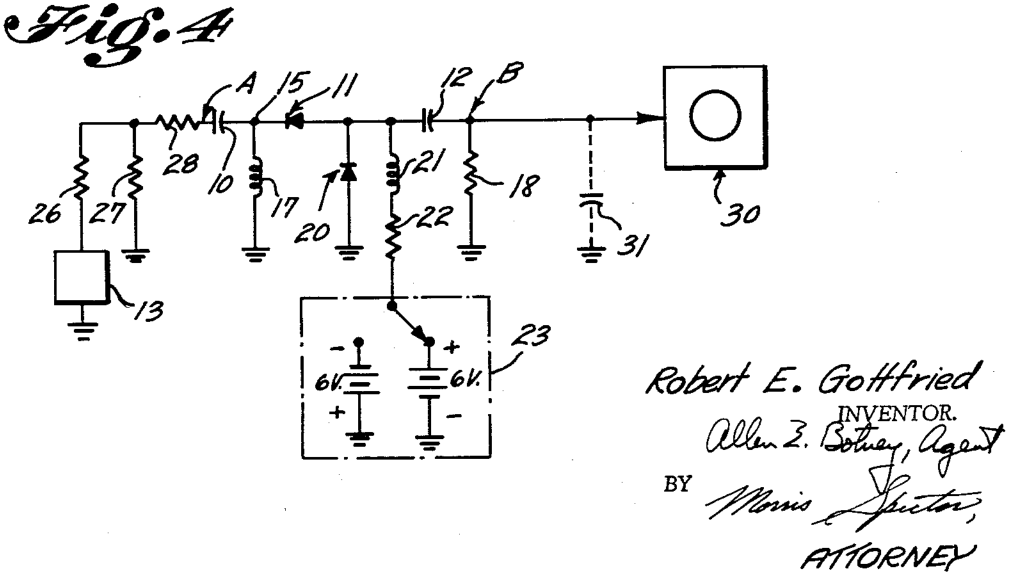
FIGURE 4 is a schematic diagram of a gating circuit according to the present invention adapted for test purposes.

Referring now to FIGURE 4, there is shown a test circuit of the present invention, the various values of inductance, capacitance, and resistance, for the various elements in the circuit being presented below as follows:

Resistor 18=10,000 ohms
Resistor 22=1,000 ohms
Resistor 27=51 ohms
Resistor 28=470 ohms
Inductor 17=2.5 millihenries, Millen type J300–2500
Inductor 21=2.5 millihenries, Millen type J300–2500
Capacitor 10=0.01 microfarad
Capacitor 12=0.01 microfarad
Crystal diode 11=Hughes 6009 diode
Crystal diode 20=Hughes 6009 diode Resistor 26 represents the output impedance of source 13 and capacitor 31 represents the distributed capacitance of a probe connected to an oscilloscope 30. Resistor 27 has been inserted in the circuit to match the impedance of source 13 and resistor 28 has been added to simulate a practical source impedance, such as from a cathode follower device.

Figure 5:
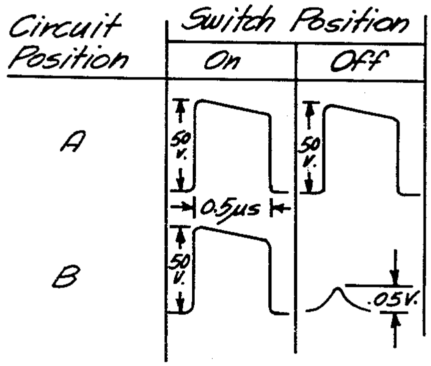
FIGURE 5 is a chart comparing the voltage waveforms obtained at various points in the circuit of FIGURE 4 in testing the circuit.

The test results from the circuit of FIGURE 4 are shown in FIGURE 5, and it will be seen from the voltage waveforms therein that when +6 volts are applied to the circuit by source 23 so that the circuit is in an "on" condition, a +50 volt pulse applied to the circuit by source 13 and appearing at point "A" will be passed to point "B" in the circuit with substantially no attenuation. On the other hand, it will also be seen that when the circut of FIGURE 4 is in an "off" condition due to the application thereto of −6 volts by source 23, a +50 volt pulse apppied to the circuit and appearing at point "A" will be very highly attenuated and appear as a 0.05 volt pulse at point "B." Thus, as previously set forth, the present invention provides a novel gating circuit for selectively passing large voltages with the use of a relatively small voltage.

Unlike most passive gates, the gating circuit of the present invention may also be used to pass or reject sine waves or bipolar signals. The operation is the same as described above but now, since the signal swings both positively and negatively, the maximum input signal is limited to less than $2E_1$. The reason for this limitation is that diode 20 could conduct and clip the negative portion of the signal. How far negative a bipolar signal can swing is a function of the direct-current potential of diode 20 with respect to ground. For this reason, therefore, a resistor should be inserted in series with inductor 17, the value of which depends on the amplitude of the negative signal to be accommodated or else a negative biasing voltage should be applied to diode 20 to sufficiently back-bias it.

Having thus described the invention, what is claimed is:

1. A gating circuit for passing electrical pulses applied thereto when said pulses coincide in time with a predetermined voltage level of a variable voltage level control signal, the magnitude of said predetermined voltage level being less than that of the applied pulses, said circuit comprising: a control terminal for receiving the control signal; a common source of potential; unidirectional current means electrically connected between said control terminal and common source, said means being receptive of the electrical pulses for passing them to an output terminal and including first and second junctions, a first resistor and first inductor connected in series between said first junction and said control terminal, the reactance of said first inductor being high at the fundamental frequency of the applied electrical pulses, a first diode connected between said first and second junctions, said first diode being forward biased and current conducting when the predetermined voltage level is applied thereto and a second inductor connected between said second junction and said common source, the reactance of said second inductor being high at the fundamental frequency of the applied pulses; a second diode connected between said common source and said first junction, said second diode being back-biased and non-conducting when the predetermined voltage level is applied thereto; first means for coupling the applied pulses to the second electrode of said first diode; a third junction; second means for electrically coupling said first and third junctions; and a second resistor connected between said third junction and said common source, the resistance of said second resistor being greater than the resistance of said first resistor.

2. The gating circuit defined in claim 1 wherein the resistance of said second resistor is at least equal to the product of the amplitude of the applied pulses and the resistance of said first resistor divided by the magnitude of the predetermined voltage level of the control signal.

3. A circuit for selectively passing electrical pulses applied to first and second input terminals thereof when said pulses coincide in time with first and second predetermined voltage levels of first and second variable voltage level control signals, respectively, the magnitude of each voltage level being less than that of the pulses applied to the associated input terminal, said circuit comprising: a first gating circuit including a first control terminal for receiving the first control signal, a common source of potential, first, second, third and fourth junctions, a first resistor and first inductor connected in series between said first junction and said first control terminal, the reactance of said first inductor being high at the fundamental frequency of the applied pulses, a first diode connected between said first and second junctions, said first diode being froward-biased and current conducting for passing the electrical pulses when the first predetermined voltage level is applied thereto, a second diode connected between said common source and said first junction, said second diode being back-biased and non-conducting when the first predetermined voltage level is applied thereto, first means connected between the first input terminal, said common source and said second junction for coupling the applied pulses from the first input terminal to said second junction, second means for electrically coupling the first and third junctions, a second resistor connected between said third junction and said common source, the resistance of said second resistor being at least equal to the product of the amplitude of the applied pulses and the resistance of said first resistor divided by the magnitude of the first predetermined voltage level of the first control signal, and a third diode connected between said third and fourth junctions, said third diode being forward-biased and current conducting when the predetermined voltage level is applied thereto; a second gating circuit including a second control terminal for receiving the second control signal, fifth, sixth, seventh and eighth junctions, a third resistor and third inductor connected in series between said fifth junction and said second control terminal, the reactance of said third inductor being high at the fundamental frequency of the applied pulses, a fourth diode connected between said fifth and sixth junctions, said fourth diode being forward-biased and current conducting for passing the applied electrical pulses when the second predetermined voltage level is applied thereto, a fourth inductor connected between said sixth junction and said common source, the reactance of said fourth inductor being high at the fundamental frequency of the applied pulses, a fifth diode connected between said common source and said fifth junction, said fifth diode being back-biased and non-conducting when the second predetermined voltage level is applied thereto, third means connected between the second input terminal, said common source and said sixth junction for coupling the applied pulses from the second input terminal to said sixth junction, fourth means for electrically coupling said fifth and seventh junctions, a fourth resistor connected between said seventh junction and said common source, the resistance of said second resistor being at least equal to the product of the amplitude of the applied pulses and the resistance of said third resistor divided by the magnitude of the second predetermined voltage level of the second control signal; a sixth diode connected between said seventh and eighth junctions, said sixth diode being forward-biased and current conducting when the second predetermined voltage level is applied thereto; and a common output load resistor connected between said common source and said fourth and eighth junctions.

4. A circuit for passing electrical pulses applied to an input terminal thereof when said pulses coincide in time with first and second predetermined voltage levels of first and second variable voltage level signals, respectively, the magnitude of said voltage levels being less than the amplitude of the applied pulses, said circuit comprising: first and second control terminals for receiving the first and second control signals, respectively; first, second, third, fourth and fifth junctions; a common source of potential; a first resistor and first inductor connected in series between said first junction and said first control terminal, the reactance of said first inductor being high at the fundamental frequency of the applied pulses; a first diode connected between said first and second junctions, said first diode being forward-biased and current conducting for passing the applied electrical pulses when the first predetermined voltage level is applied thereto;

a second diode connected between said common source and said first junction, said diode being back-biased and non-conducting when the first predetermined voltage level is applied thereto; first means connected between the input terminal, said common source and said second junction for coupling the applied pulses from the input terminal to said second junction; second means for electrically coupling said first and third junctions; a third inductor connected between said third junction and said common source, the reactance of said third inductor being high at the fundamental frequency of the applied pulses; a second resistor and fourth inductor connected in series between said fourth junction and said second control terminal, the reactance of said fourth inductor being high at the fundamental frequency of the applied pulses; a third diode connected between said fourth and third junctions, said third diode being forward-biased and current conducting for passing the applied electrical pulses when the second predetermined voltage level is applied thereto; a fourth diode connected between said common source and said fourth junction, said fourth diode being back-biased and non-conducting when the second predetermined voltage level is applied thereto; third means for electrically coupling said fourth junction to said fifth junction; and an output load resistor connected between said fifth junction and said common source, the resistance of said output load resistor being greater than the resistance of said first and second resistors.

References Cited in the file of this patent

UNITED STATES PATENTS

| | | |
|---|---|---|
| 2,557,729 | Eckert | June 19, 1951 |
| 2,712,065 | Elbourn et al. | June 28, 1955 |
| 2,760,160 | Flood et al. | Aug. 21, 1956 |
| 2,762,936 | Forrest | Sept. 11, 1956 |
| 2,851,614 | Emanuelsson | Sept. 9, 1958 |